April 18, 1944.  A. BENZICK  2,347,025
AUTOMOBILE SEAT
Filed Dec. 2, 1940
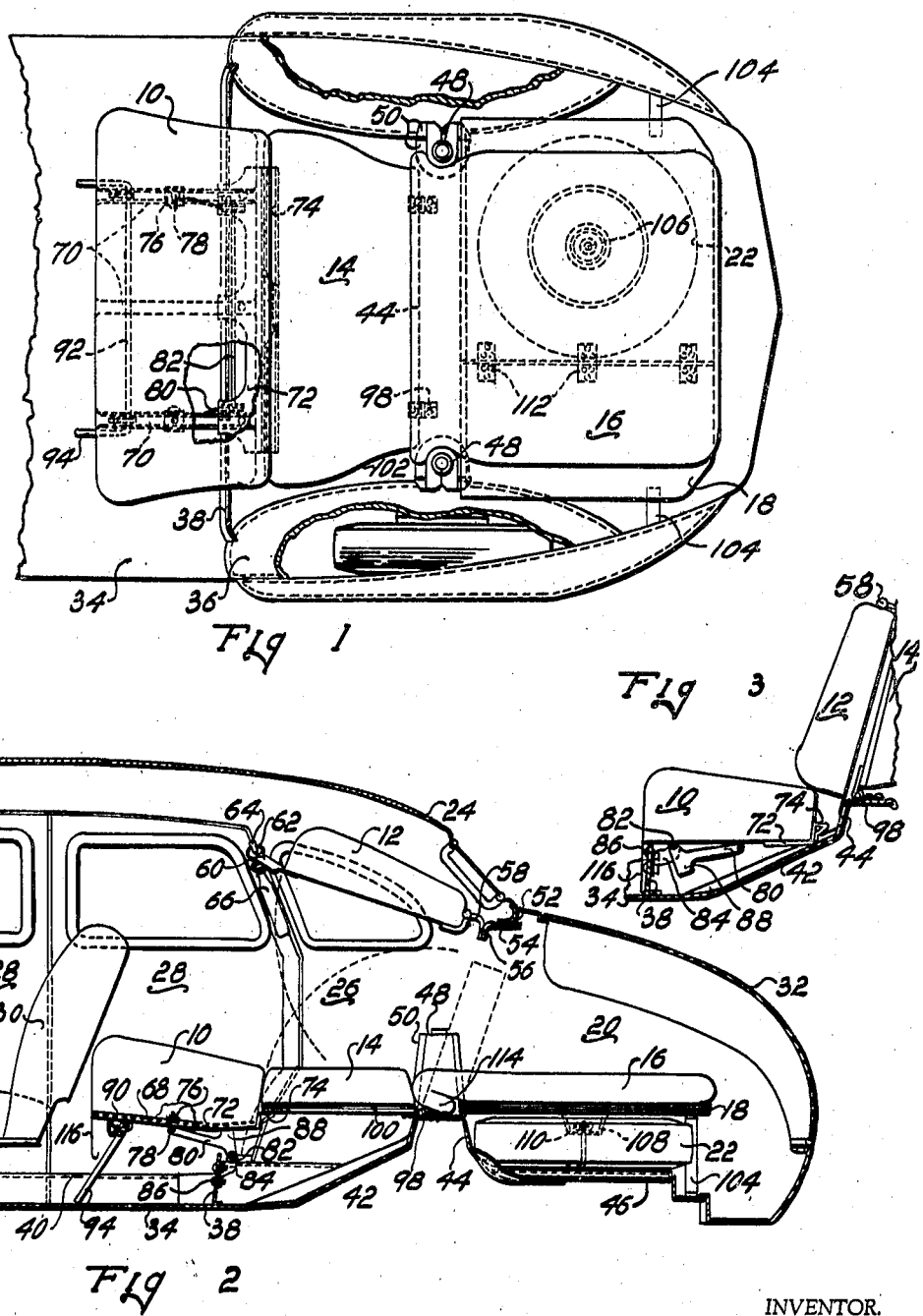
INVENTOR.
ALEXANDER BENZICK
BY Carl J. Barbee
        ATTORNEY.

UNITED STATES PATENT OFFICE 2,347,025

AUTOMOBILE SEAT

Alexander Benzick, Milwaukee, Wis., assignor to Nash-Kelvinator Corporation, Kenosha, Wis., a corporation of Maryland Application December 2, 1940, Serial No. 368,114

3 Claims. (Cl. 155—7)

This invention relates to automobile seats and has particular reference to an automobile seat which is convertible to form a bed in the automobile.

It is an object of this invention to provide novel seat construction which may be converted to form a bed in the back of an automobile.

It is another object of this invention to provide means for converting a seat into a bed so that a minimum of space is occupied by the seat both in its normal and converted positions.

It is another object of this invention to provide a seat of novel construction which may be converted into a bed with a minimum of effort.

Other objects and advantages of this invention will be apparent from a consideration of the following description and claims and the attached drawings, of which there is one sheet, and in which:

Figure 1 represents a plan view of the rear portion of an automobile with the slide walls and doors not shown;

Figure 2 represents a longitudinal sectional view through the automobile showing the seat and bed in elevation, and;

Figure 3 represents an end elevation showing the seat in normal position.

Generally, the objects of the invention are accomplished by providing a back seat which consists of a seat cushion 10 and a back cushion 12. The back cushion 12 is arranged to be swung forwardly and upwardly where it is suspended in a manner which will be more particularly described later. The seat cushion 10 is moved forwardly from its normal position and an auxiliary cushion 14 is tipped down from its normal position behind the back cushion 12 to a horizontal position adjacent to the back edge of the seat cushion 10. The remainder of the bed is made up of a pad 16 which rests upon a deck 18 located within the luggage compartment 20 of the automobile and just over the spare tire 22.

More specifically, the drawings illustrate a seat installed in an automobile having the usual top 24, side walls 26, doors 28 and front seat 30. To the rear of the top 24 there is provided a deck 32 which covers the luggage compartment 20.

The body of the automobile is mounted upon an underbody assembly which consists of a floor panel 34 and wheel house panels 36 (see Figure 1). The floor panel 34 and wheel house panels 36 are interbraced by a transverse panel 38 which is welded or otherwise suitably secured to the floor and wheel houses. The floor 34 curves upwardly in the center of the car as at 40 in Figure 2 so as to form a longitudinal tunnel for receiving the drive shaft of the automobile. To the rear of the transverse panel 38, the floor 34 slopes upwardly as at 42 and is formed into a downwardly opening channel portion 44 which extends transversely across the automobile and is arranged to clear the rear axle of the automobile. To the rear of the transverse channel 44, the floor extends backwardly as at 46 to form the floor of the luggage compartment 20.

As is illustrated in Figure 1 the sides of the floor 34 are cut away to receive the wheel house panels 36. The channel portion 44 of the floor is interbraced with the wheel house panels 36 by means of two semicylindrical towers 48 which are provided with flanges 50 and welded to the floor and wheel houses. The towers 48 are arranged to receive the upper ends of strut type shock absorbers (not shown) which cushion the body of the automobile on the rear axle.

Near the top of the deck 32 where the deck joins with the top 24 the body is provided with a transversely extending curved plate 52 along the underside of which is welded a generally horizontal plate 54 having a downwardly extending flange 56. The flange 56 serves to support one leaf of each of a series of hinges 58, the other leaves of which are secured to the top edge of the back cushion 12. The back cushion 12 is thus pivotally supported by the horizontal plate 54 so that it may be swung forwardly and upwardly to the position shown in Figure 2. The lower corners of the cushion 12 are provided with straps 60 and rings 62 which may be engaged with hooks 64 mounted on the side wall 26 so as to support the back cushion in its raised position. The hooks 64 may also support the assist straps 66.

The seat cushion 10 is provided with a suitable base 68 which includes several longitudinally extending braces 70 and a plate 72 which extends along the back edge of the frame. The back edge of the plate 72 is bent upwardly along the back of the cushion 10 and then into a rail 74 of triangular shaped cross section.

The end braces 70 are provided with clips 76 intermediate their ends, which clips are arranged to support pivot pins 78. The pins 78 are connected to a pair of links 80, the other ends of which are rigidly secured to a shaft 82. The shaft 82 is journaled in a pair of brackets 84 fastened to the back side of the transverse panel 38 by means of the bolts 86. The links 80 are provided with ears 88 which are arranged to abut against the plate 72 when the cushion 10 is in its forward or converted position.

The forward ends of the braces 70 are provided with suitable clips 90 which support a transversely extending shaft 92, the ends of which are turned down to form legs 94 for supporting the forward edge of the cushion in its extended position. The links 80 are rigidly connected to the shaft 82 so as to move in unison; therefore, by raising one end of the cushion 10 the other end will follow, making the cushion 10 easy to extend.

Secured to the top of the channel portion 44 of the floor 34 is a pair of hinges 98, one leaf of each of which is secured to the bottom or rear edge of a base 100. The base 100 forms a part of the auxiliary cushion 14 and attention is called to the fact that both the cushion 14 and base 100 are cut away along their lower edge as at 102 in Figure 1 in order to clear the towers 48 when the cushion is in its raised position. The base 100 is of such a length that it will rest upon the triangular rail 74 on the back of the seat cushion when the cushion 10 is in its extended position. The hinges 98 are mounted closely adjacent to the forward edge of the channel portion 44 so that the auxiliary cushion 14 will stand closely adjacent to the back cushion 12 when these cushions are in their normal position; thus the cushion 14 occupies very little space in the luggage compartment 20.

The forward edge of the deck 18 rests upon the rear edge of the channel portion 44 and is therefore on the same level as the base 100 of the auxiliary cushion 14. The rear edge and sides of the deck 18 may be conveniently supported by brackets 104 secured to the sides of the luggage compartment 20. The panel 18 is apertured as at 106 so that access may be had to a clip 108 and wing nut 110 by means of which the spare tire 22 is retained in place underneath the panel 18. The panel 18 is also divided and hinged as at 112 (see Figure 1) so that that portion of the panel 18 which does not cover the spare wheel 22 may be folded back to make the full height of the luggage compartment 20 available for large packages. Attention is called to the fact that the pad 16 which covers the panel 18 is provided with a double fold 114 which is arranged to fit within the space between the base 100 of the auxiliary cushion and the panel 18, thus giving a generally flat surface along the tops of cushions 14 and 16. When not in use, the pad 16 may be rolled into a small bundle and stored in the luggage compartment.

Attention is called to the fact that with the seat in extended position to form a bed, ample space is left underneath the seat cushion 10 and underneath the auxiliary cushion 14 to store luggage which may have been removed from the luggage compartment 20 in order to make room for the pad 16. Space is also provided underneath the panel 18 beside the wheel 22 and between the end of the panel 18 and the rear end of the luggage compartment. In its raised or normal position the rear seat rests upon the transverse panel 38 and the sloping portion 42 of the floor 34. The legs 94 and levers 80 are, of course, folded underneath the cushion 10 and are out of sight. A skirt 116 may be provided along the forward edge of the cushion 10 to cover the transverse panel 38 when the same is in normal position.

While I have described my invention in some detail, I intend this description to be an example only and not as a limitation of my invention to which I make the following claims:

1. In an automobile, a convertible seat comprising a seat cushion, a plate secured to the lower rear edge of said seat cushion, said plate forming a rail along the rear edge of said cushion, arms pivotally connected between said cushion and a portion of said automobile and arranged to swing said seat cushion to a forwardly adjusted position, stop lugs on said arms located intermediate the ends thereof and projecting from one side of said arms in the plane of swinging movement of said arms to abut against said plate and support said seat cushion when said seat cushion is in forwardly adjusted position, and an auxiliary cushion pivotally supported behind said seat cushion and having an edge portion swingable into contact with said rail when said seat cushion is in forwardly adjusted position.

2. In an automobile, a convertible seat comprising a seat cushion, a plate secured to the underside of said seat cushion along the rear edge thereof and forming a rail along the rear edge of said cushion, means supporting said seat cushion in normal position, arms each having one end pivotally secured to said means and their other ends pivotally secured to said seat cushion forwardly from said plate, stop lugs on said arms located intermediate the ends thereof and projecting from one side of said arms in the plane of swinging movement of said arms and engageable with said plate when said seat cushion and arms are swung forwardly to a converted position, and an auxiliary cushion pivotally supported in said automobile to the rear of said seat cushion and swingable forwardly into contact with said rail when said seat cushion is in converted position.

3. In an automobile having a floor, a transverse brace extending across said floor, a seat cushion supported upon said transverse brace at its forward edge, a link having a first pivotal connection to said transverse brace and a second pivotal connection to said seat at a point intermediate the edges of said seat, a stop lug formed on said link intermediate the ends of said link and projecting to one side thereof in the plane of swinging movement of said link and arranged to support the rear edge of said seat when said seat is moved upwardly and forwardly, a rail carried on the back edge of said seat cushion, and an auxiliary cushion pivotally supported in said automobile and rearwardly from said seat cushion and arranged to rest upon said rail when said seat cushion and auxiliary cushion are rotated forwardly.

ALEXANDER BENZICK.